United States Patent
Oumi

(10) Patent No.: US 10,357,880 B2
(45) Date of Patent: Jul. 23, 2019

(54) OFFLINE PROGRAMMING DEVICE AND POSITION-PARAMETER CORRECTING METHOD

(71) Applicant: FANUC CORPORATION, Yamanashi (JP)

(72) Inventor: Tatsuya Oumi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 85 days.

(21) Appl. No.: 15/856,299

(22) Filed: Dec. 28, 2017

(65) Prior Publication Data

US 2018/0200890 A1  Jul. 19, 2018

(30) Foreign Application Priority Data

Jan. 17, 2017 (JP) ................................ 2017-006069

(51) Int. Cl.
  *B25J 9/16* (2006.01)
  *G05B 19/408* (2006.01)
  *G05B 19/425* (2006.01)

(52) U.S. Cl.
  CPC .......... *B25J 9/1692* (2013.01); *B25J 9/1671* (2013.01); *G05B 19/4083* (2013.01); *G05B 19/425* (2013.01); *G05B 2219/36503* (2013.01)

(58) Field of Classification Search
  CPC .......... B25J 9/1692; B25J 9/02; B25J 9/1671; G05B 19/4083; G05B 19/425; G05B 2219/36503; G05B 19/401; G05B 19/4086; G05B 19/42; G05B 2219/39015; G05B 2219/39022; G05B 2219/39399

USPC .................. 700/251, 254; 901/3; 318/568.19
See application file for complete search history.

(56) References Cited

U.S. PATENT DOCUMENTS

| 4,456,961 A | 6/1984 | Price et al. |
| 4,761,745 A * | 8/1988 | Kodaira ................. G05B 19/42 318/568.13 |
| 5,412,759 A * | 5/1995 | Yano .................. G05B 19/4083 700/248 |

(Continued)

FOREIGN PATENT DOCUMENTS

| CN | 104729407 A | 6/2015 |
| CN | 105643369 A | 6/2016 |

(Continued)

OTHER PUBLICATIONS

Office Action dated Jul. 31, 2018 in corresponding Japanese Patent Application No. 2017-006069; 6 pages including English-language translation.

(Continued)

*Primary Examiner* — Bao Long T Nguyen
(74) *Attorney, Agent, or Firm* — Maier & Maier, PLLC

(57) ABSTRACT

Provided is an offline programming device that generates, while being offline, a program for operating a robot, wherein, when a coordinate system that serves as a reference for the robot is changed, a position parameter generated on the basis of a coordinate system before the change is automatically corrected on the basis of the coordinate system before the change and a coordinate system after the change so that absolute positions of the position parameter become equal to each other before and after the change.

4 Claims, 6 Drawing Sheets

(56) References Cited

U.S. PATENT DOCUMENTS

| | | | | |
|---|---|---|---|---|
| 5,731,679 | A | * | 3/1998 | Owens .................. B25J 9/1692 318/568.19 |
| 10,011,011 | B2 | * | 7/2018 | Sugaya ................... B25J 9/161 |
| 2002/0038855 | A1 | * | 4/2002 | Hwang ................. B25J 9/1692 250/559.29 |
| 2016/0151915 | A1 | | 6/2016 | Nishi et al. |
| 2016/0325431 | A1 | * | 11/2016 | Watanabe .............. G05B 19/42 |
| 2018/0036883 | A1 | * | 2/2018 | Nishitani ............... B25J 9/1671 |

FOREIGN PATENT DOCUMENTS

| | | |
|---|---|---|
| CN | 106182018 A | 12/2016 |
| EP | 0470257 A1 | 2/1992 |
| EP | 0 573 657 A1 | 12/1993 |
| JP | S63-259703 A | 10/1988 |
| JP | H01-283603 A | 11/1989 |
| JP | H03-251378 A | 11/1991 |
| JP | H05-19840 A | 1/1993 |
| JP | H06-019522 A | 1/1994 |
| JP | H06-095730 A | 4/1994 |
| JP | H09-044226 A | 2/1997 |
| JP | H10-083208 A | 3/1998 |
| JP | H11-110026 A | 4/1999 |
| JP | 2013-198956 A | 10/2013 |

OTHER PUBLICATIONS

Search Report dated Jul. 25, 2018 in corresponding Japanese Patent Application No. 2017-006069; 23 pages including English-language translation.

Chinese Office Action dated Mar. 20, 2019, in connection with corresponding CN Application No. 201810032481.2 (15 pgs., including English translation).

Xue Han, "Research and Application of Robot Motion Function Pose Matrix", China New Technologies and Products, No. 11, 2013, pp. 2-3 (7 pgs., including English translation).

\* cited by examiner

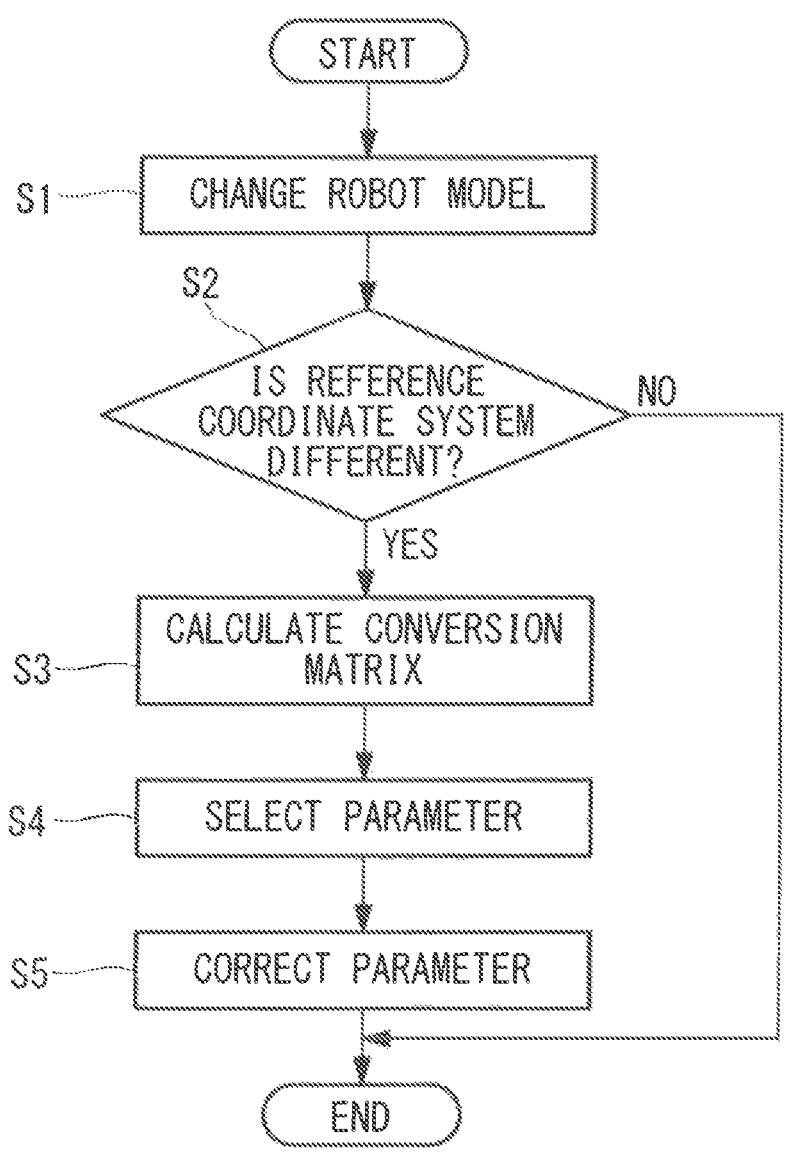

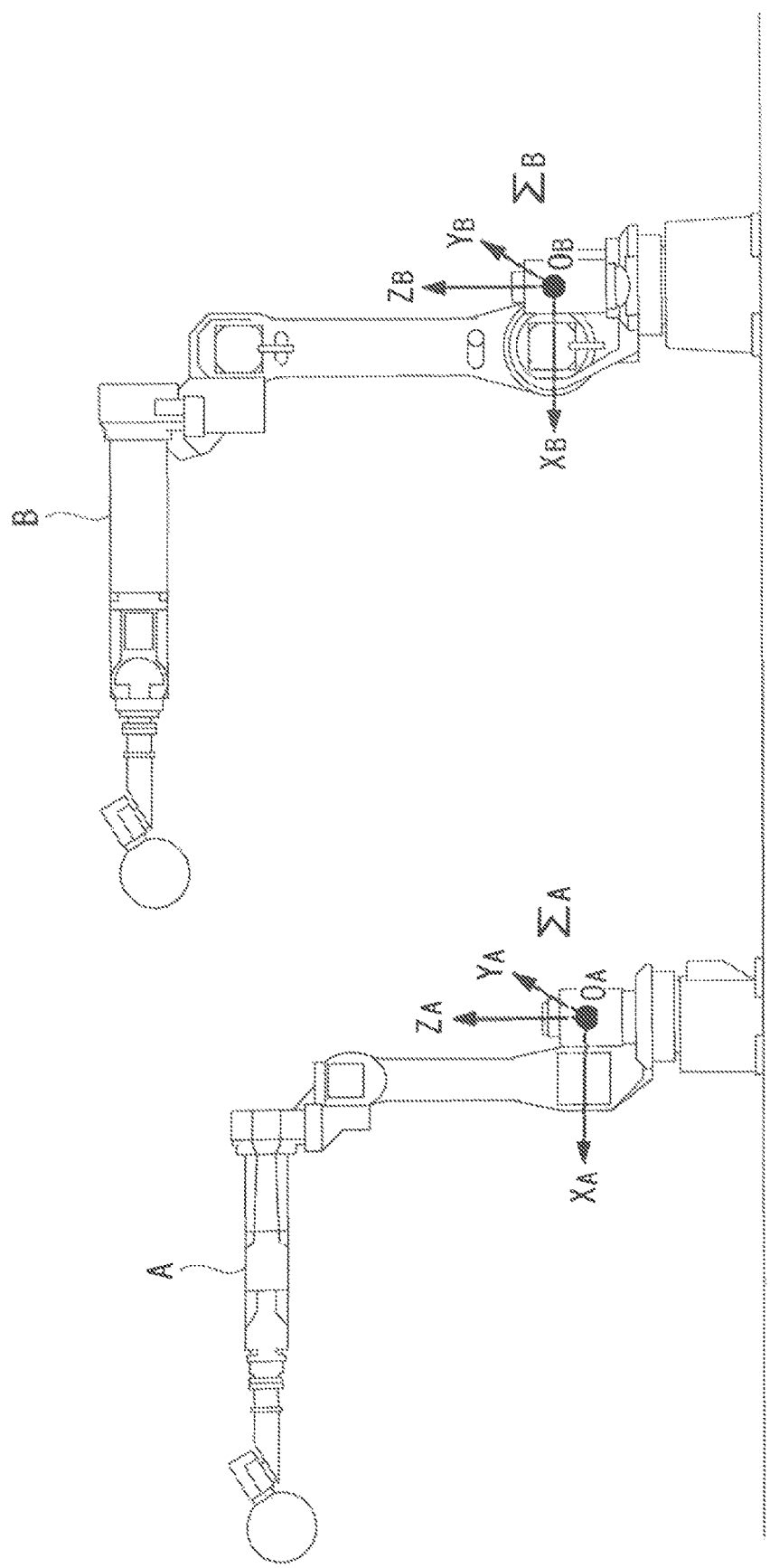

US 10,357,880 B2

OFFLINE PROGRAMMING DEVICE AND POSITION-PARAMETER CORRECTING METHOD

CROSS-REFERENCE TO RELATED APPLICATIONS

This application is based on Japanese Patent Application No. 2017-006069, the content of which is incorporated herein by reference.

TECHNICAL FIELD

The present invention relates to an offline programming device that generates, while being offline, a robot operating program and a position-parameter correcting method.

BACKGROUND ART

In the related art, with an offline programming device, it is known that a program is created with reference to a reference coordinate system that is set in advance (for example, see Japanese Publication No. H 3-251378).

SUMMARY

The present invention provides the following solutions.

A first aspect of the present invention is an offline programming device that generates, while being offline, a program for operating a robot, wherein, when a coordinate system that serves as a reference for the robot is changed, a position parameter generated on the basis of a coordinate system before the change is automatically corrected on the basis of the coordinate system before the change and a coordinate system after the change so that absolute positions of the position parameter become equal to each other before and after the change.

A second aspect of the present invention is an offline programming device that generates, while being offline, a program for operating a robot, the offline programming device including: a matrix calculating portion that calculates a conversion matrix with which, when a coordinate system that serves as a reference for the robot is changed, the coordinate system before the change is converted to a coordinate system after the change; a parameter selecting portion that selects a position parameter to which the conversion matrix is applied; and a parameter correcting portion that corrects the selected position parameter by applying the conversion matrix thereto.

A third aspect of the present invention is a position-parameter correcting method in an offline programming device that generates, while being offline, a program for operating a robot, wherein, when a coordinate system that serves as a reference for the robot is changed, a position parameter generated on the basis of a coordinate system before the change is automatically corrected on the basis of the coordinate system before the change and a coordinate system after the change so that absolute positions of the position parameter become equal to each other before and after the change.

A fourth aspect of the present invention is a position-parameter correcting method in an offline programming device that generates, while being offline, a program for operating a robot, the position-parameter correcting method including: a step of calculating a conversion matrix with which, when a coordinate system that serves as a reference for the robot is changed, the coordinate system before the change is converted to a coordinate system after the change; a step of selecting a position parameter to which the conversion matrix is applied; and a step of correcting the selected position parameter by applying the conversion matrix thereto.

BRIEF DESCRIPTION OF DRAWINGS

FIG. 5 is a flowchart showing processing executed by the offline programming device shown in FIG. 1.

FIG. 6 is a diagram for explaining reference coordinate systems individually set for different robots.

DESCRIPTION OF EMBODIMENTS

Figure 1:
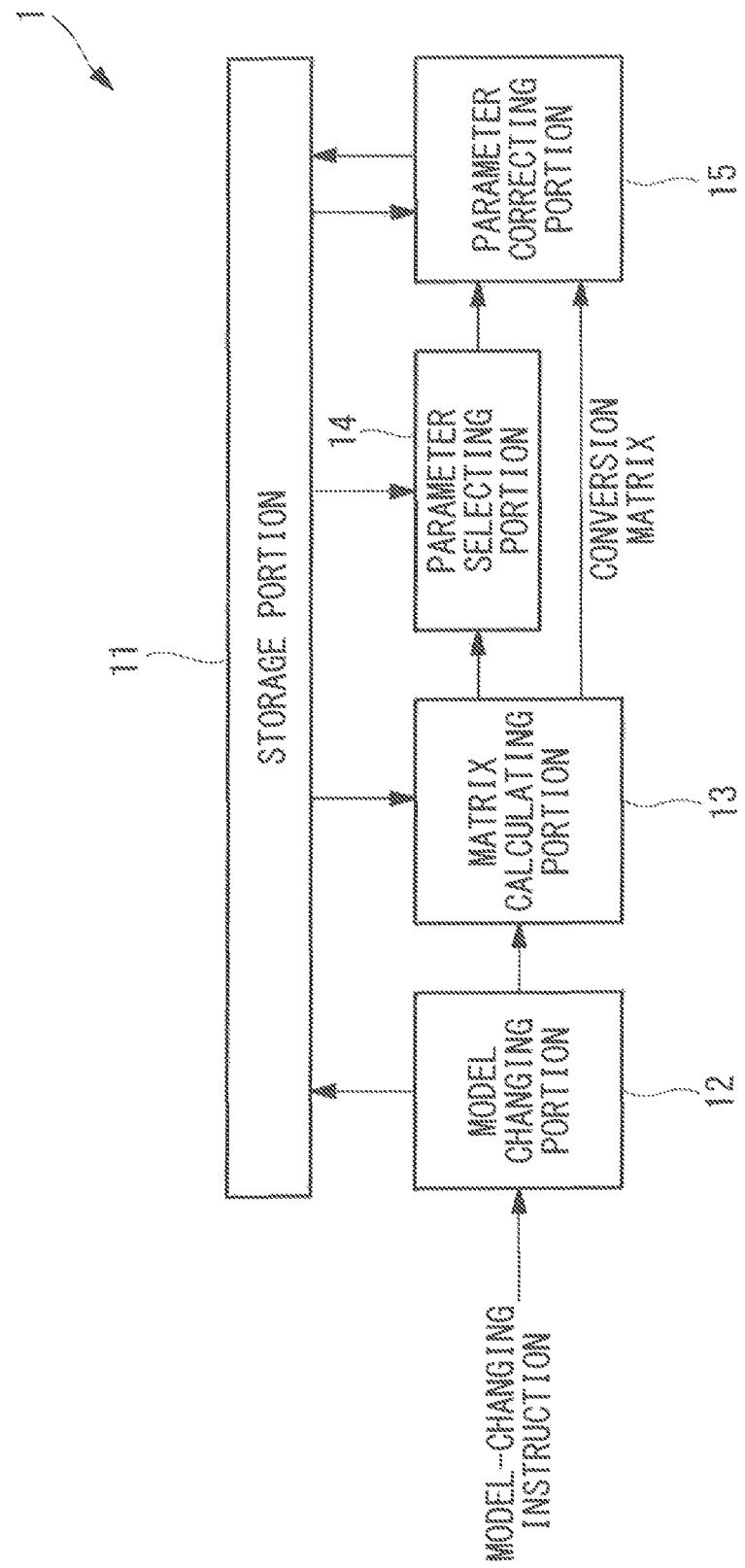
FIG. 1 is a diagram showing, in outline, the configuration of an offline programming device according to a first embodiment of the present invention.
Figure 2:
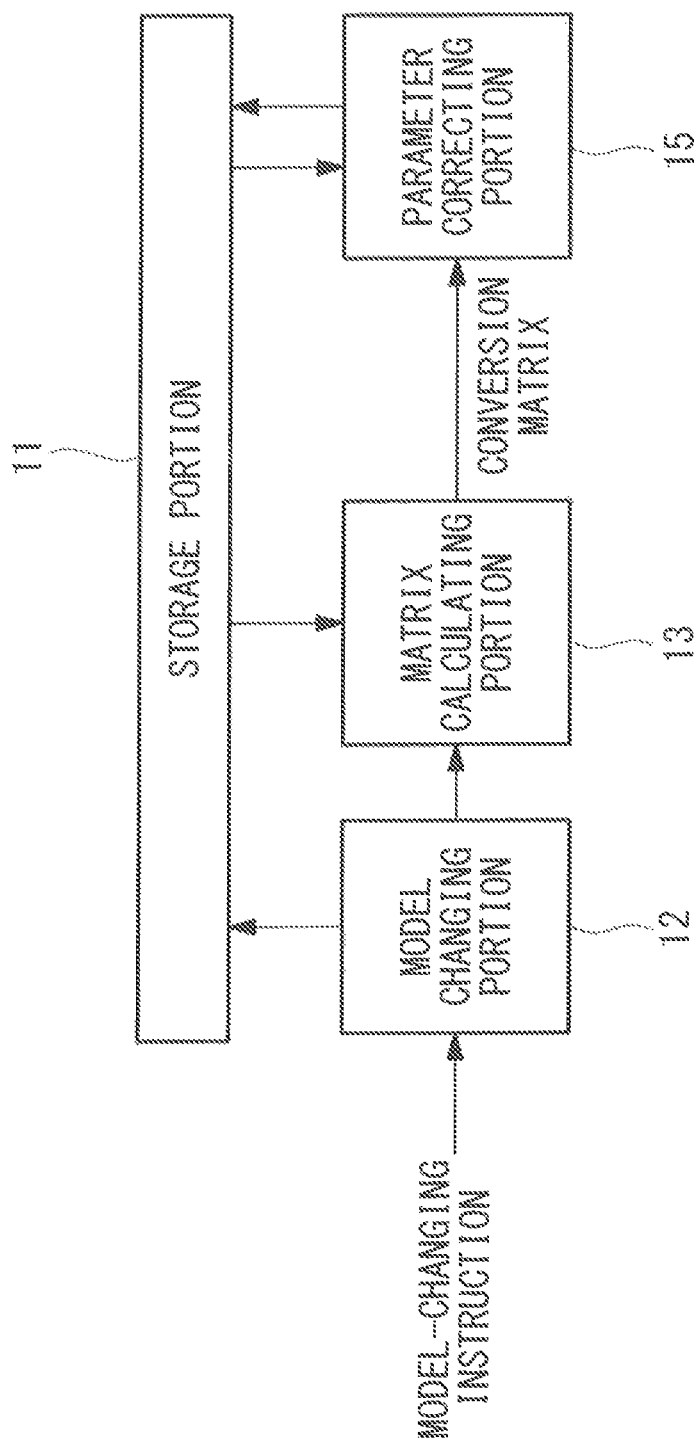
FIG. 2 is a diagram showing, in outline, the configuration of an offline programming device according to a second embodiment of the present invention.
Figure 3:
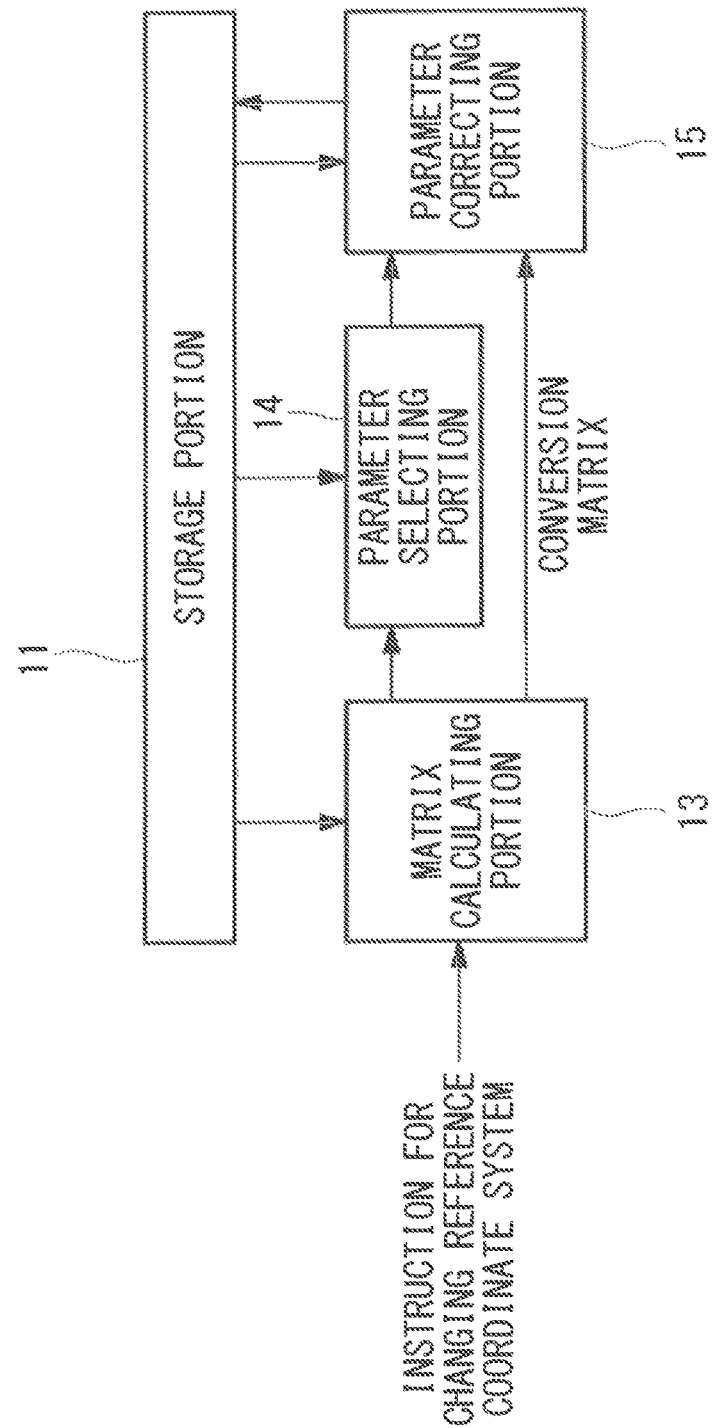
FIG. 3 is a diagram showing, in outline, the configuration of an offline programming device according to a third embodiment of the present invention.

As shown in FIGS. 1 to 4, in some embodiments according to the present invention, a storage portion 11, a matrix calculating portion 13, and a parameter correcting portion 15 are provided. As shown in FIGS. 1 and 3, in some embodiments according to the present invention, a parameter selecting portion 14 is provided in addition to the storage portion 11, the matrix calculating portion 13, and the parameter correcting portion 15. In an example embodiment shown in FIG. 2, a model changing portion 12 is provided in addition to the storage portion 11, the matrix calculating portion 13, and the parameter correcting portion 15. In an example embodiment shown in FIG. 3, the parameter selecting portion 14 is provided in addition to the storage portion 11, the matrix calculating portion 13, and the parameter correcting portion 15.

An offline programming device 1 according to a first embodiment of the present invention will be described in detail below with reference to the drawings.

As components connected with each other via a bus, though not illustrated in the figures, the offline programming device 1 of this embodiment is provided with: a CPU (Central Processing Unit); a main storage device such as a ROM (Read Only Memory), a RAM (Random Access Memory) or the like; an auxiliary storage device such as an HDD (Hard Disk Drive) or the like; an input device such as a keyboard, a mouse, a touchscreen, or the like; an output device such as a monitor or the like; and an external interface that communicates various data with external equipment such as a robot control device or the like. In other words, the offline programming device 1 of this embodiment is provided with a computer. The auxiliary storage device stores various programs, and various types of processing are realized by the CPU reading out the programs from the auxiliary storage device to the main storage device, such as the RAM or the like, and executing the programs.

As shown in FIG. 1, as functional blocks to be executed by the CPU, the offline programming device 1 according to this embodiment is provided with: the storage portion 11; the model changing portion 12; the matrix calculating portion 13; the parameter selecting portion 14; and the parameter correcting portion 15.

The model changing portion 12 is connected to the storage portion 11 and the matrix calculating portion 13. The matrix calculating portion 13 is connected to the storage portion 11, the model changing portion 12, the parameter selecting portion 14, and the parameter correcting portion 15. The parameter selecting portion 14 is connected to the storage portion 11, the matrix calculating portion 13, and the parameter correcting portion 15. The parameter correcting portion 15 is connected to the storage portion 11, the matrix calculating portion 13, and the parameter selecting portion 14.

The storage portion 11 is constituted of portions of the above-described main storage device and auxiliary storage device, and is configured so as to store reference coordinate systems set for individual models of the robot, a user coordinate system defined by a user, a robot operating program (hereinafter, referred to as a robot program), and so forth. Note that the reference coordinate systems are set so that, for example, an intersect between the center of a turning axis, which is a first axis of the robot, and a horizontal plane including the center of a rotation axis, which is a second axis of the robot, serves as the origin thereof, as shown in FIG. 6.

Upon receiving a model-changing instruction from the user, the model changing portion 12 changes the model of the robot that executes a robot program stored in the storage portion 11 and issues a notification indicating that there has been a model change to the matrix calculating portion 13.

Upon receiving the notification from the model changing portion 12, the matrix calculating portion 13 calculates a conversion matrix for performing homogeneous transformation on the basis of the reference coordinate system set for the model of the robot before the model change, stored in the storage portion 11, and the reference coordinate system set for the model of the robot after the model change, stored in the storage portion 11 by the model changing portion 12. In addition, the matrix calculating portion 13 issues, to the parameter selecting portion 14, a notification indicating that the conversion matrix has been calculated and transmits the calculated conversion matrix to the parameter correcting portion 15.

Upon receiving the notification from the matrix calculating portion 13, the parameter selecting portion 14 displays lists of the robot programs and the user coordinate systems stored in the storage portion 11 on the monitor, and prompts the user to select a position parameter such as position data included in a robot program or a user coordinate system to which the conversion matrix calculated by the matrix calculating portion 13 is applied. In addition, the parameter selecting portion 14 issues a notification about the robot program and/or the user coordinate system selected by the user to the parameter correcting portion 15.

The parameter correcting portion 15 applies the conversion matrix calculated by the matrix calculating portion 13 to the position parameter such as the teaching point of the robot program and/or the user coordinate system selected in the parameter selecting portion 14, and corrects the position parameter so that the position parameter in which the reference coordinate system for the robot before the model change serves as the reference is converted to the position parameter in which the reference coordinate system for the robot after the model change serves as the reference. In other words, the position parameter is automatically corrected so that the absolute positions of the position parameter become equal to each other before and after the model change. In addition, the parameter correcting portion 15 stores the robot program and/or the user coordinate system including the corrected position parameter in the storage portion 11.

Next, a position-parameter correcting method of this embodiment that is executed by the thus-configured offline programming device 1 will be described with reference to FIGS. 1 and 5. In the following, the method will be described in terms of an example in which the robot model is changed from a robot A to a robot B shown in FIG. 6.

First, in the model changing portion 12, in accordance with the model-changing instruction input by the user, instructing to change the robot model from the robot A to the robot B, the target for which the robot program stored in the storage portion 11 is executed is changed from the robot A to the robot B (step S1 in FIG. 5).

Note that, although the model-changing instruction from the user may be given by means of any method, it is preferable to employ, for example, a method in which, in the offline programming device, a list including all models of the robot is displayed when the user presses a "robot model change" button, and the robot model is changed when the user selects the robot model to be used after the change and presses an "OK" button.

Next, upon receiving, from the model changing portion 12, the notification indicating that the robot model has been changed from the robot A to the robot B, in the matrix calculating portion 13, it is determined whether a reference coordinate system $\Sigma_A$ for the robot A before the model change, stored in the storage portion 11, is different from a reference coordinate system $\Sigma_B$ for the robot B after the model change, stored in the storage portion 11 (step S2 in FIG. 5). In the case in which the reference coordinate system $\Sigma_A$ and the reference coordinate system $\Sigma_B$ are determined to be identical coordinate systems, the processing is terminated.

In the case in which the reference coordinate system $\Sigma_A$ and the reference coordinate system $\Sigma_B$ are determined to be different coordinate systems, in the matrix calculating portion 13, a conversion matrix $^B T_A$ for making the conversion from the reference coordinate system $\Sigma_B$ to the reference coordinate system $\Sigma_A$ is calculated (step S3 in FIG. 5). In the case of the example shown in FIG. 6, the conversion matrix $^B T_A$ is represented by expression (1).

$$^B T_A = \begin{bmatrix} ^B R_A & ^B P_A \\ 0 & 1 \end{bmatrix} = \begin{bmatrix} 1 & 0 & 0 & 0 \\ 0 & 1 & 0 & 0 \\ 0 & 0 & 1 & -75 \\ 0 & 0 & 0 & 1 \end{bmatrix} \quad (1)$$

Here, $^B R_A$ represents a rotation matrix of the reference coordinate system $\Sigma_A$ with respect to the reference coordinate system $\Sigma_B$, and $^B P_A$ represents a position vector of the reference coordinate system $\Sigma_A$ with respect to the reference coordinate system $\Sigma_B$.

Next, upon receiving a notification indicating that the conversion matrix $^B T_A$ has been calculated, in the parameter selecting portion 14, the user selects a robot program or a user coordinate system to which the calculated conversion matrix $^B T_A$ is applied (step S4 in FIG. 5).

In this way, by prompting the user to explicitly select the robot program or the user coordinate system to which the conversion matrix $^B T_A$ is applied, it is possible to prevent the conversion matrix $^B T_A$ from being applied to a position parameter to which the application thereof should not be made. For example, because the conversion matrix $^{B}T_{A}$ should not be applied to a position parameter in which the reference coordinate system for the robot A, which is the robot before the model change, is not set so as to serve as the reference thereof, robot programs and user coordinate systems including such a position parameter are prevented from being selected.

Note that, when prompting the user to select the position parameter, it is preferable to display lists of the robot programs and the user coordinate systems on the monitor, and to allow the user to select a robot program or a user coordinate system that serves as a correction target from among the listed items. Alternatively, the user may first be queried whether or not to correct the position parameter, and the above-described lists may be displayed in the case in which the user returns a response indicating that the correction will be performed, and the processing may be terminated in the case in which the user returns a response indicating that the correction is not to be performed.

Next, in the parameter correcting portion 15, by applying the conversion matrix $^{B}T_{A}$ calculated by the matrix calculating portion 13 to the position parameter included in the robot program and the user coordinate system selected in the parameter selecting portion 14, the position parameter is corrected (step S5 in FIG. 5). Specifically, as indicated in expression (2), by multiplying a point expressed by a vector $^{A}r$ based on the reference coordinate system $\Sigma_{A}$ by the conversion matrix $^{B}T_{A}$, a point expressed by a vector $^{B}r$ based on the reference coordinate system $\Sigma B$ is obtained.

$$\begin{bmatrix} ^{B}r \\ 1 \end{bmatrix} = {^{B}T_{A}} \begin{bmatrix} ^{A}r \\ 1 \end{bmatrix} \quad (2)$$

As has been described above, with this embodiment, because it is possible to automatically convert the position parameter, such as the teaching point included in the robot program, the user coordinate system, or the like, selected by the user, it is possible to reduce the man-hours required for the user to correct the position parameter.

As has been described above, although the first embodiment of the present invention has been described in detail with reference to the drawings, specific configurations are not limited to this embodiment, and design alterations or the like within a range that does not depart from the scope of the present invention are also encompassed.

Although the above-described first embodiment has been described in terms of the example in which the reference coordinate system is changed when changing the robot model, there is no limitation thereto. For example, in the case in which only the installation position of a robot of the same model is changed without changing the robot model, it is permissible to employ a configuration in which, as in a third embodiment shown in FIG. 3 or a fourth embodiment shown in FIG. 4, the matrix calculating portion 13 may directly receive, instead of the model-changing instruction from the user, an instruction for changing the reference coordinate system from the user, and may calculate the conversion matrix on the basis of this instruction for changing the reference coordinate system. In this case, the instruction for changing the reference coordinate system may include a relative positional relationship between the reference coordinate system before the change and the reference coordinate system after the change.

Figure 4:
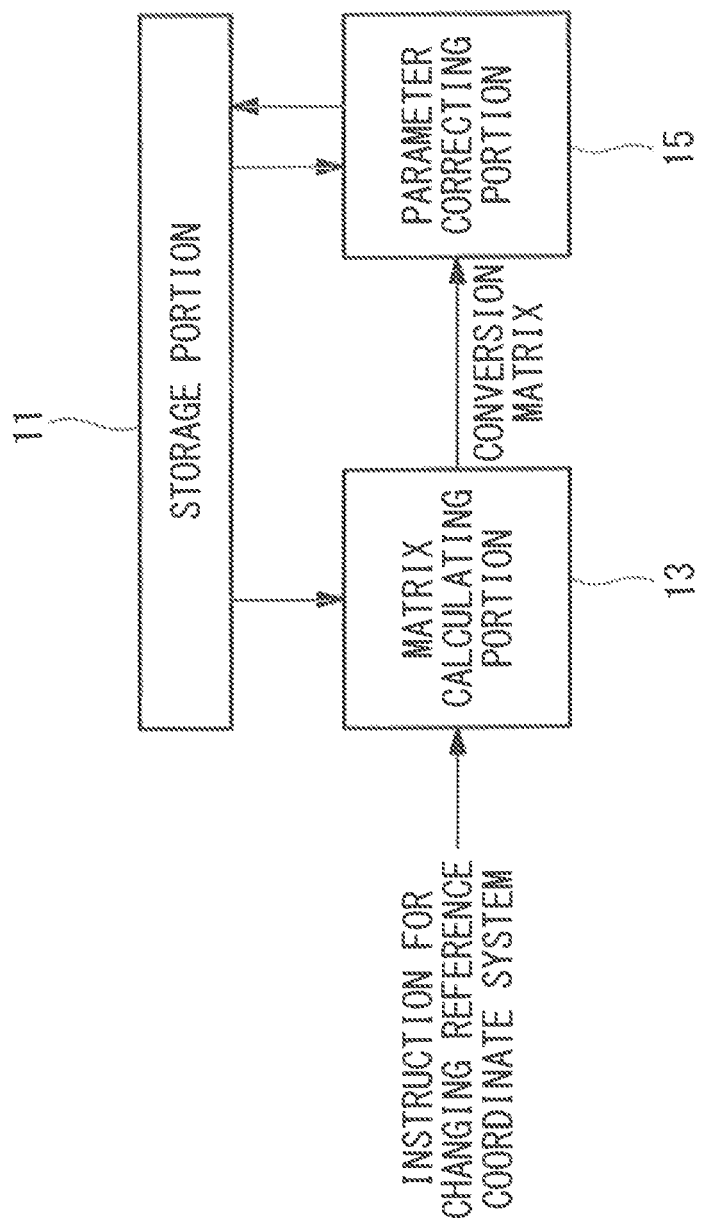
FIG. 4 is a diagram showing, in outline, the configuration of an offline programming device according to a fourth embodiment of the present invention.

In addition, although it is assumed that the above-described first embodiment is provided with the parameter selecting portion 14, in the case in which a robot program or a user coordinate system including the position parameter to which the conversion matrix should be applied is set in advance, in other words, in the case in which a position parameter generated on the basis of the reference coordinate system before the change is already known, as in a second embodiment shown in FIG. 2 or the fourth embodiment shown in in FIG. 4, a configuration in which the parameter selecting portion 14 is not provided may be employed. In this case, in the parameter correcting portion 15, the conversion matrix may be applied to all position parameters generated on the basis of the reference coordinate system before the change.

As a result, the above-described embodiments lead to the following aspects.

A first aspect of the present invention is an offline programming device that generates, while being offline, a program for operating a robot, wherein, when a coordinate system that serves as a reference for the robot is changed, a position parameter generated on the basis of a coordinate system before the change is automatically corrected on the basis of the coordinate system before the change and a coordinate system after the change so that absolute positions of the position parameter become equal to each other before and after the change.

With this configuration, when the coordinate system that serves as a reference for the robot is changed, because a position parameter generated on the basis of a coordinate system before the change is automatically corrected on the basis of the coordinate system before the change and a coordinate system after the change so that absolute positions of the position parameter become equal to each other before and after the change, it is possible to reduce man-hour required for a user to perform the correction of the position parameter.

Note that a position parameter means a parameter related to positions of a robot, and includes position coordinate data such as a teaching point or the like in a robot operating program, position coordinate data included in a user coordinate system defined by the user, and so on.

In addition, an absolute position is defined as a position based on a world coordinate system, which is a coordinated system fixed on the ground.

A second aspect of the present invention is an offline programming device that generates, while being offline, a program for operating a robot, the offline programming device including: a matrix calculating portion that calculates a conversion matrix with which, when a coordinate system that serves as a reference for the robot is changed, the coordinate system before the change is converted to a coordinate system after the change; a parameter selecting portion that selects a position parameter to which the conversion matrix is applied; and a parameter correcting portion that corrects the selected position parameter by applying the conversion matrix thereto.

With this configuration, when the coordinate system that serves as a reference for the robot is changed, the matrix calculating portion calculates the conversion matrix with which the coordinate system before the change is converted to the coordinate system after the change. In addition, the parameter selecting portion selects the position parameter to which the conversion matrix is applied. Then, the parameter correcting portion corrects the selected position parameter by applying the conversion matrix thereto.

By doing so, when a coordinate system that serves as a reference for the robot is changed, because the position parameter is automatically corrected so that absolute positions of the position parameter become equal to each other before and after the change, it is possible to reduce man-hour required for a user to perform the correction of the position parameter.

The offline programming device according to any one of the above-described aspects may employ a configuration in which the coordinate system that serves as the reference for the robot is changed when the model of the robot is changed.

The offline programming device according to any one of the above-described aspects may employ a configuration in which the position parameter includes position data that serves as a reference in the operating program.

A third aspect of the present invention is a position-parameter correcting method in an offline programming device that generates, while being offline, a program for operating a robot, wherein, when a coordinate system that serves as a reference for the robot is changed, a position parameter generated on the basis of a coordinate system before the change is automatically corrected on the basis of the coordinate system before the change and a coordinate system after the change so that absolute positions of the position parameter become equal to each other before and after the change.

A fourth aspect of the present invention is a position-parameter correcting method in an offline programming device that generates, while being offline, a program for operating a robot, the position-parameter correcting method including: a step of calculating a conversion matrix with which, when a coordinate system that serves as a reference for the robot is changed, the coordinate system before the change is converted to a coordinate system after the change; a step of selecting a position parameter to which the conversion matrix is applied; and a step of correcting the selected position parameter by applying the conversion matrix thereto.

The present invention affords an advantage in that it is possible to reduce man-hour required for a user to perform correction of an operating program when a coordinate system that serves as a reference for a robot is changed.

REFERENCE SIGNS LIST

1 offline programming device
11 storage portion
12 model changing portion
13 matrix calculating portion
14 parameter selecting portion
15 parameter correcting portion

The invention claimed is:

1. An offline programming device that generates, while being offline, a program for operating a robot, the offline programming device comprising:
   a matrix calculating portion that calculates a conversion matrix with which, when a coordinate system that serves as a reference for the robot is changed, the coordinate system before the change is converted to a coordinate system after the change;
   a parameter selecting portion that selects a position parameter to which the conversion matrix is applied; and
   a parameter correcting portion that corrects the selected position parameter by applying the conversion matrix thereto.

2. An offline programming device according to claim 1, wherein the coordinate system that serves as the reference for the robot is changed when the model of the robot is changed.

3. An offline programming device according to claim 1, wherein the position parameter includes position data that serves as a reference in the operating program.

4. A position-parameter correcting method in an offline programming device that generates, while being offline, a program for operating a robot, the position-parameter correcting method comprising:
   calculating a conversion matrix with which, when a coordinate system that serves as a reference for the robot is changed, the coordinate system before the change is converted to a coordinate system after the change;
   selecting a position parameter to which the conversion matrix is applied; and
   correcting the selected position parameter by applying the conversion matrix thereto.

* * * * *